United States Patent
Deas et al.

(10) Patent No.: US 9,065,978 B2
(45) Date of Patent: Jun. 23, 2015

(54) METHOD FOR ACQUIRING SERVICES ON A MULTIPLICITY OF DEVICES

(75) Inventors: David A. Deas, Round Rock, TX (US); Michael F. Grannan, Austin, TX (US); Umesh M. Desai, Austin, TX (US); Anil K. Doradla, Austin, TX (US); Lalitha Suryanarayana, Austin, TX (US); David R. Wolter, Austin, TX (US); Dinesh Nadarajah, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 829 days.

(21) Appl. No.: 11/312,990

(22) Filed: Dec. 19, 2005

(65) Prior Publication Data
US 2007/0142033 A1   Jun. 21, 2007

(51) Int. Cl.
| | |
|---|---|
| H04M 1/66 | (2006.01) |
| H04N 7/173 | (2011.01) |
| H04N 21/258 | (2011.01) |
| H04N 21/41 | (2011.01) |
| H04N 21/436 | (2011.01) |
| H04N 21/472 | (2011.01) |
| H04N 21/475 | (2011.01) |

(52) U.S. Cl.
CPC ...... *H04N 7/17318* (2013.01); *H04N 21/25816* (2013.01); *H04N 21/25875* (2013.01); *H04N 21/4104* (2013.01); *H04N 21/43622* (2013.01); *H04N 21/47202* (2013.01); *H04N 21/4753* (2013.01)

(58) Field of Classification Search
CPC .................................................. H04W 12/08
USPC ......................................................... 455/411
See application file for complete search history.

(56) References Cited

U.S. PATENT DOCUMENTS

| | | | | |
|---|---|---|---|---|
| 7,003,481 | B2 * | 2/2006 | Banka et al. ................... | 705/26 |
| 7,113,765 | B2 * | 9/2006 | Minear et al. ................. | 455/405 |
| 2002/0087670 | A1 * | 7/2002 | Epstein et al. ................ | 709/223 |
| 2002/0112183 | A1 * | 8/2002 | Baird et al. .................. | 713/201 |
| 2003/0046407 | A1 | 3/2003 | Erickson et al. | |
| 2003/0120784 | A1 * | 6/2003 | Johnson et al. ............... | 709/228 |
| 2004/0002878 | A1 * | 1/2004 | Maria Hinton ................. | 705/7 |
| 2004/0254993 | A1 * | 12/2004 | Mamas ......................... | 709/206 |
| 2005/0261058 | A1 * | 11/2005 | Nguyen et al. ................. | 463/40 |
| 2007/0038931 | A1 * | 2/2007 | Allaire et al. ................ | 715/526 |
| 2007/0209065 | A1 * | 9/2007 | Branam et al. .................. | 726/5 |
| 2008/0005064 | A1 * | 1/2008 | Sarukkai .......................... | 707/3 |

FOREIGN PATENT DOCUMENTS

| | | |
|---|---|---|
| AU | 2003 212742 | 9/2003 |
| EP | 1530860 | 5/2005 |
| WO | WO 2005 070145 | 8/2005 |

\* cited by examiner

*Primary Examiner* — Huy C Ho
(74) *Attorney, Agent, or Firm* — Guntin & Gust, PLC; Andrew Gust

(57) ABSTRACT

A system and method are disclosed for acquiring services on a multiplicity of devices. A system that incorporates teachings of the present disclosure may include, for example, a service management center (SMC) (100) that has a plurality of service centers (102-110) for supplying services to a corresponding plurality of devices (120-128), and a controller (112) for managing operations of the service centers. The controller is programmed to receive (202) from a select one of the devices an identification reference in response to a request for service by an end user, search (210) for one or more services associated with the identification reference, select (212) from the search results one or more services appropriate for the requesting device, and enable (220) the one or more services on the selected device.

20 Claims, 3 Drawing Sheets

METHOD FOR ACQUIRING SERVICES ON A MULTIPLICITY OF DEVICES

FIELD OF THE DISCLOSURE

The present disclosure relates generally to service management centers, and more specifically to a method for acquiring services on a multiplicity of devices.

BACKGROUND

As consumers grow accustomed to ubiquitous communications, a need arises for a method to acquire services subscribed to by consumers on any device in any location.

DETAILED DESCRIPTION

Embodiments in accordance with the present disclosure provide a method for acquiring services on a multiplicity of devices.

In a first embodiment of the present disclosure, a computer-readable storage medium in a service management center (SMC) manages operations of a plurality of service centers. The storage medium has computer instructions for enabling a selection of one or more services of the service centers on a select one of a plurality of devices according to a single identification reference supplied by an end user to enable any of the services of the service centers.

In a second embodiment of the disclosure, the SMC has a plurality of service centers for supplying services to a corresponding plurality of devices, and a controller for managing operations thereof. The controller can be programmed to receive from a select one of the devices an identification reference in response to a request for service by an end user, search for one or more services associated with the identification reference, select from the search results one or more services appropriate for the requesting device, and enable the one or more services on the selected device.

In a third embodiment of the disclosure, a computer-readable storage medium in a select one of a plurality of devices has computer instructions for acquiring access to a select one or more services from a plurality of service centers on the selected device according to a single identification reference transmitted by the selected device.

Figure 1:
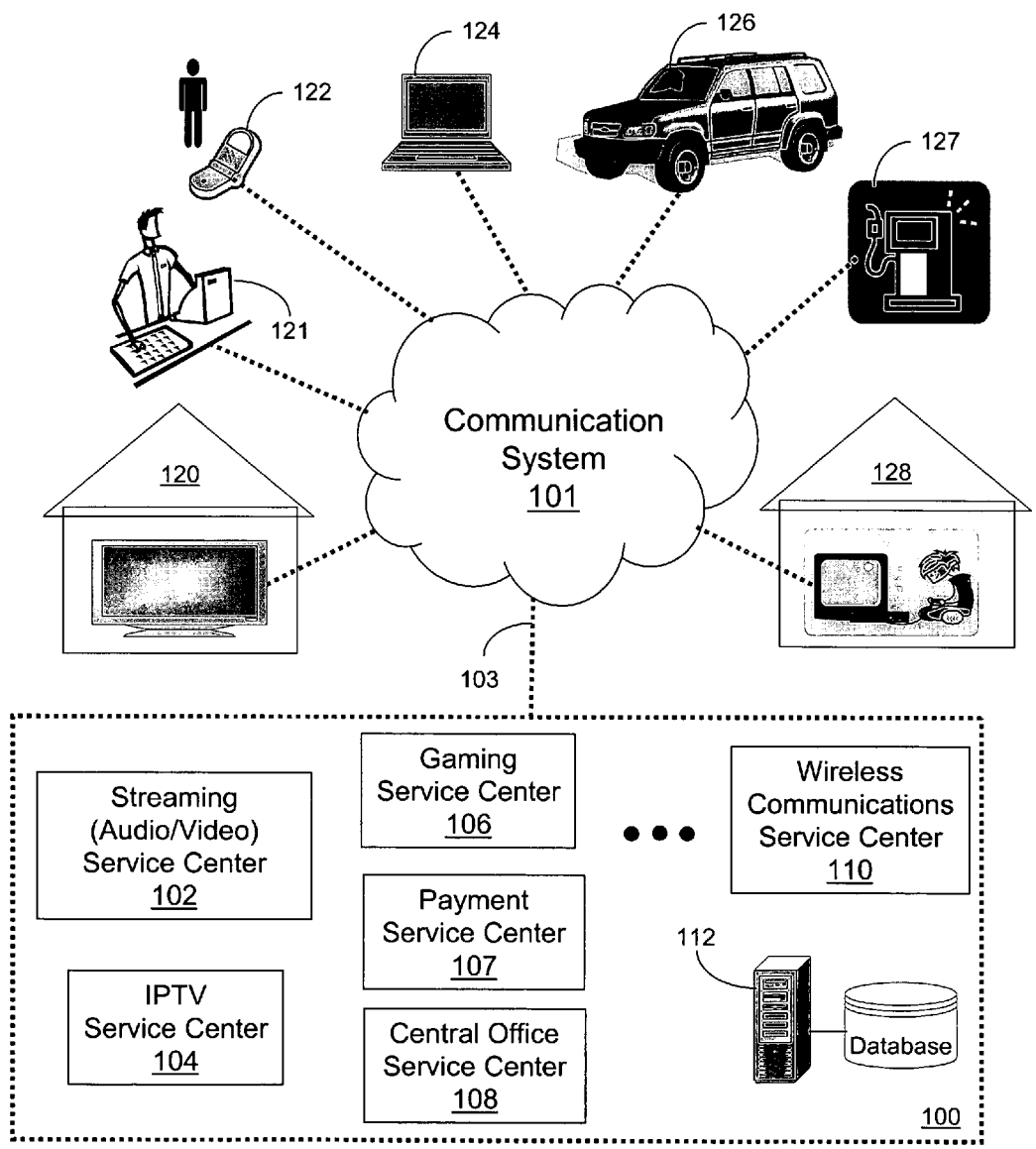
FIG. 1 is a block diagram of a service management center (SMC) according to teachings of the present disclosure.

FIG. 1 is a block diagram of the SMC 100 according to teachings of the present disclosure. The SMC 100 comprises one or more service centers such as a streaming audio and video service center 102, an Internet Protocol Television (IPTV) service center 104, a gaming service center 106, a payment service center 107, a central office service center 108, and a wireless communications service center 110, just to mention a few. Each of the service centers is coupled by landline or wireless communication means to a controller 112 that manages the centers. The controller 112 can be a scalable server with one or more databases managed by applications such as a customer relationship management (CRM) system.

Although the service centers 102-110 are shown separately, it would be apparent to one of ordinary skill in the art that portions of the service centers can be integrated with each other and the controller 112.

The streaming audio and video service center 102 can utilize common streaming technology for supplying services such as streaming television programming, streaming radio service, streaming video on demand, and so on. The IPTV service center 104 can supply consumers a higher quality service such as broadband high definition television (HDTV). The gaming service center 106 can provide consumers game services similar to those available for GameBoy™, GameCube™, PlayStation®, and other gaming applications. The payment service center 107 can support credit or debit payment transactions as commonly offered by companies such as MasterCard®, Visa®, American Express®, PayPal®, and so on. The payment service center 107 can offer consumers a means to pay for services and/or consumer goods on demand at any location.

The central office service center 108 provides common landline services such as POTS (Plain Old Telephone Services), voice over IP (VoIP), and/or broadband services such as cable, or xDSL (Digital Subscriber Line). The wireless communications service center 110 can support common wireless services such as cellular communications, dispatch services, WiFi, and/or WiMax.

There are numerous devices available to an end user for interacting with the aforementioned service centers 102-110—some of which are illustrated by way of example in FIG. 1. For example, the end user can have a digital and/or analog television set 120 residing in a residence with integrated or combined functions such as those found in a set top box. Alternatively, an end user can have a device that operates in the context of merchandizing such as, for example, a merchant's cash register 121 for conducting sales of consumer goods and services. In another embodiment, the end user can utilize a portable device such as a cell phone 122 (or multi-mode device) capable of voice, location services, and high-speed data communications across one or more access technologies such as cellular, WiFi, and WiMax. In yet another embodiment, an end user can utilize a laptop or desktop computer 124 capable of processing over the Internet multimedia services such as streaming video and audio.

An end user's automobile 126 can include telematics services which collectively can support vehicle tracking and positioning, on-line vehicle navigation and information systems with emergency assistance, and/or broadband entertainment services such as movies, network TV programming, and/or games on demand. Similarly, a merchant's fuel station can include one or more devices for accepting payment from consumers on credit at a fuel pump 127. An end user can also utilize a common gaming device 128 for playing 2-D and 3-D interactive games downloaded from, or operating at the gaming service center 106 with multiple players competing at single or remote sites.

Each of these devices 120-128 can include a user interface which can support among other things means for biometric identification, a magnetic card reader, a smart card reader, an RFID reader, a barcode reader, or an electromechanical input such as a keypad. In the case of biometrics, the devices 120-128 can include common biometric technology for identifying an end user by audible or image recognition. Thus, an end user can identify him or herself by voice recognition, a thumb print, retinal scanning, facial scanning, or any other biometric feature available for identification purposes. For increased security, the biometric signature of the end user can be a hybrid of identifiers such as, for example, an out of ordinary audible phrase and/or alpha-numeric code dictated by the end user combined with a thumb print. Accordingly, the more identifiers the end user provides the more secure the identification process.

For those devices that cannot afford the sophistication of biometrics, an RFID reader, a magnetic card reader for credit or debit cards, a smart card reader, a barcode reader, or a keypad interface can be used. A passive or active RFID tag can be integrated in the end user's keychain, wallet, cell phone, clothing article, or any other suitable location which can be readily accessed by the RFID reader. Alternatively, the end user can use a credit or debit card, a smart card such as subscriber identity module (SIM) card commonly used in cell phones, or a card with a barcode ID for identification purposes. The end user can also enter an identifier by way of a keypad.

As noted earlier, combinations of identifiers can be used for increased security. With a single or combination of identifiers one or more identification references can be established for the end user for the purposes of acquiring access to the service centers 102-110 from a select one of the devices 120-128. Given the likelihood that not all of the devices will have the same means for identification, the end user can carry multiple means for submitting an identification reference. For example, the end user can carry a credit or debit card which when combined with a coded entry supplies an identification reference for the controller 112 of the SMC 100 to process. For other devices 120-128 that support a smart card or biometric interface, other identification references can be supplied.

The controller 112 can thus be programmed with each of the identification references available to the end user, thereby collectively establishing a single identification reference for the end user to access any of the services that s/he has subscribed to with the service centers 102-110. To limit the inconvenience to the end user in carrying or memorizing a number of identification references, the service provider of the SMC 100 can promote not more than two and perhaps a single means of identification (such as biometrics or RFID) among the service centers 102-110 that support the aforementioned devices 120-128.

Thus, for example, the payment service center 107 can offer their customers (e.g., retailers 121, fuel stations 127, and others) commercial incentives to install an RFID reader or biometric reader at their location to support end users of the SMC 100. Similarly, manufacturers of consumer electronics (cell phones 122, telematics system 126 for automobiles, computers 124, television sets 120, gaming devices 128) can also be offered commercial incentives to provide a common interface for processing end user identification. Alternatively, accessories can be designed by third party manufacturers for these devices to support a single user interface.

Connectivity between the devices 120-126 and the SMC 100 can be accomplished by way of a wired and/or wireless communication link 103 to a communication system 101. The communication system 101 can utilize circuit-switched or packet-switched network technology, or combinations thereof. As a hybrid system, the communication system 101 can support disparate communication technologies such as cellular (or any generation thereof), WiFi, WiMax, landline, or optical communications. Each of the aforementioned service centers 102-110 can therefore provide by way of the communication system 101 interactive two-way communications, or passive services that terminate at any of the devices 120-128 accessible to the end user.

Figure 2:
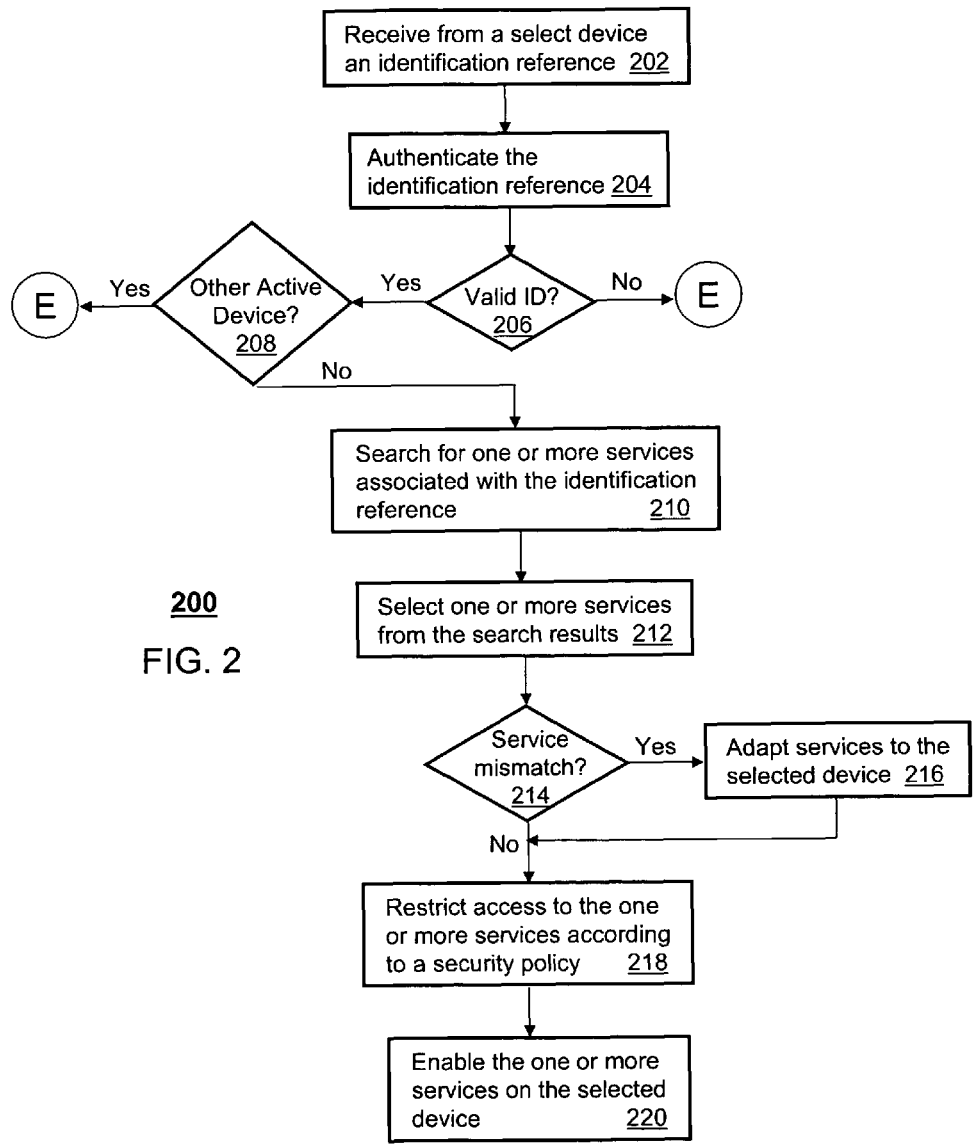
FIG. 2 depicts a flowchart of a method operating in the SMC according to teachings of the present disclosure.

FIG. 2 depicts a flowchart of a method 200 operating in the SMC 100 according to teachings of the present disclosure. Method 200 begins with step 202 where the controller 112 is programmed to receive from a select one of the devices 120-128 an identification reference. The identification reference can be entered by any of the input means discussed earlier for devices 120-128. Thus, for example, when the end user needs to purchase fuel for her automobile, she can swipe her credit card at the fuel pump 127 on a magnetic reader and for added security provide additional identification such as a coded entry (PIN and/or zip code) on a keypad of the fuel pump 127. The identification reference provided for the fuel pump can similarly be shared across any device made available to the end user.

Given the ubiquitous service offerings of the SMC 100, it should be apparent to an artisan with skill in the art that the present disclosure is not limited to devices owned by the end user. An end user, for example, can borrow a friend's or family member's cell phone 122 capable of accepting services from the SMC 100. The end user can then enter an identification reference (SIM card, biometrics, RFID, etc.) specific to the end user as a means for requesting service, which the controller 112 in step 202 can intercept by way of the communication system 101. Similarly, an end user can be present at a neighbor's home and request activation of landline services and/or IPTV services by entering his/her identification reference by any means available in the neighbor's home.

Upon receiving the identification reference in step 202, the controller 112 authenticates it in step 204 if a matched entry is found in its database. If the identification reference is invalid, the controller 112 in step 206 rejects the request for service. Otherwise, the controller 112 proceeds to step 208 where it checks whether the service requested is enabled for the end user on a device different from the selected device. If service is enabled on a device different from the selected device, the controller 112 rejects the request for service. This step provides the service provider of the SMC 100 a means to prevent sharing of services with unsubscribed users.

If there is no other device enabled with the requested service, the controller 112 proceeds to step 210 where it searches in its database for one or more services associated with the identification reference. From the search results the controller 112 in step 212 selects one or more services appropriate for the requesting device. If the controller 112 detects in step 214 a service mismatch with the device selected by the end user, then the controller 112 proceeds to step 216 where it adapts the service to the selected device. This step can be useful when the service requested needs to be modified in order to function properly on the selected device.

For example, the end user may be requesting the service s/he was previously operating on the gaming device 128 to now be operated on a cell phone 122. In this instance, the controller 112 may require the service center 106 to adapt the gaming service so that it is compatible with the dimensions and resolution of the display of the cell phone 122, and its data speed and computing and memory resources. These adjustments would take place before enabling gaming service on the cell phone 122 by way of a downloadable application or interactive streaming service.

For additional security, the controller 112 proceeds to step 218 where it restricts access to the one or more services requested according to a security policy. This step can be used, for example, when the end user requests for service(s) on a device not belonging to him, thus further eliminating the possibility of an unsubscribed user gaining access to service indefinitely. The security policy can dictate, for example, a limited period of use of the requested service. In the case of downloaded multimedia content such as movies, music, and ebooks, a digital rights management (DRM) policy can be attached to the content. The policy can also provide a limited period of use, a restriction to forward or copy content, and/or other common copyright restrictions. Once these restrictions have been established, the controller 112 causes in step 220 the one or more service centers associated with the services selected in step 212 to be enabled on the device selected by the end user.

Method 200 as described above can be applied to countless applications and embodiments involving interactions between service centers 102-110 and devices 120-128. Method 200 can also be varied substantially without departing from the scope and spirit of the claims described below. For instance, method 200 can be simplified within the scope of the claims so that controller 112 processes one or more identification references submitted by the end user from any number of devices and enables one or more services that the end user has subscribed to on the requested devices independent of who owns the requesting device, or whether the same service is enabled on other devices.

Method 200 also permits an end user to roam and enable services from device to device independent of ownership. For example, an end user can acquire services at any time in any location so long as a device capable of processing services from the SMC 100 can be made available to the end user. Additionally, when the end user enables services on a borrowed device, the billing of such services will not affect the true owner of the device since the SMC 100 is aware of who the end user is at the time the services are active.

It would be apparent to one of ordinary skill in the art that the functions operating in the SMC 100 can be modified in part so that they operate in any one of the aforementioned devices 120-128. Accordingly, said modifications can also be considered to be within the scope and spirit of the claims described below.

Figure 3:
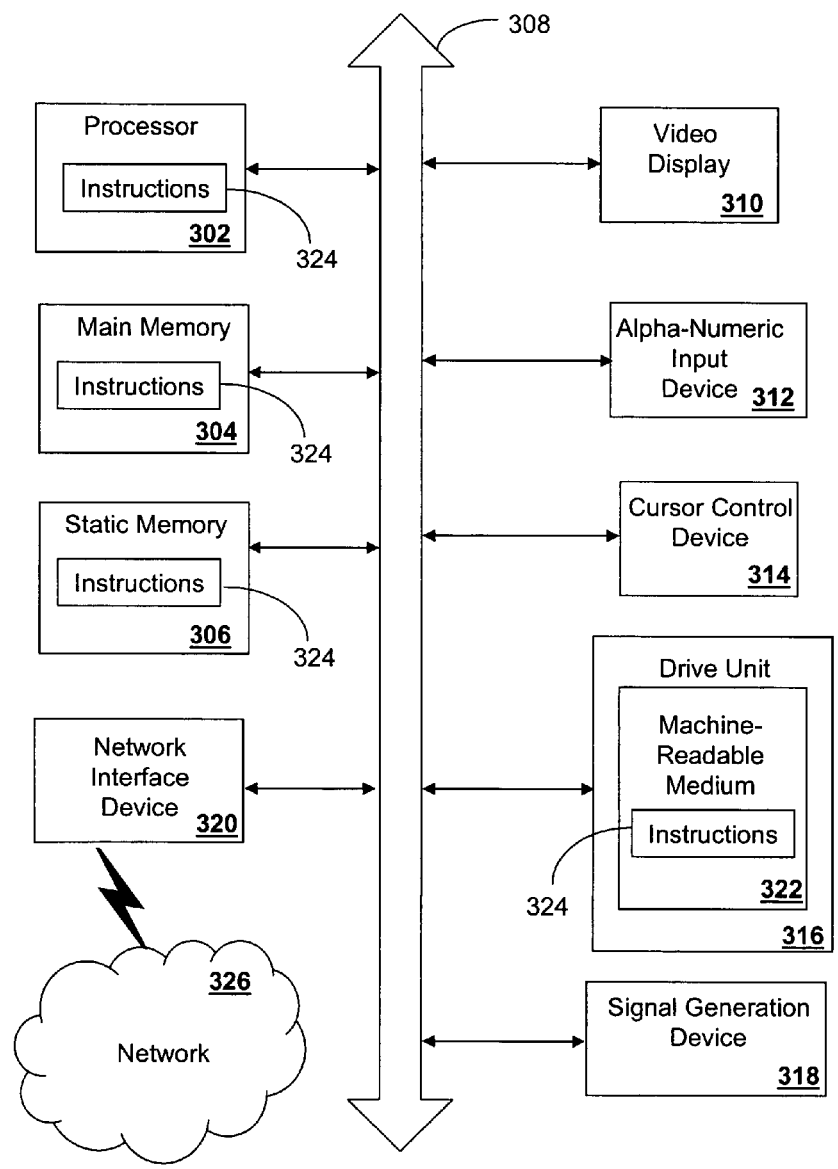
FIG. 3 is a diagrammatic representation of a machine in the form of a computer system within which a set of instructions, when executed, may cause the machine to perform any one or more of the methodologies discussed herein.

FIG. 3 is a diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions which, responsive to being executed by a processor in a service management center for managing operations of service centers, cause the processor to perform operations comprising:

enabling a selection of a service from among a group of services provided by the service centers on a target device;

receiving, from the target device, a single identification reference associated with the selection of the service, wherein the single identification reference is not associated with the target device, wherein the single identification reference is inputted into the target device by a user via a user interface of the target device when a request for the service is generated by the target device, and wherein the single identification reference is inputted into the target device via the user interface without utilizing an identity module of the target device;

authenticating the single identification reference;

determining if the service is enabled for the user on a second device;

responsive to a first determination that the single identification reference is valid according to the authenticating and responsive to a second determination that the service is not enabled for the user on the second device, providing the target device with access to the service;

determining whether the target device is associated with a subscription plan of the user; and responsive to a determination that the target device is not associated with the subscription plan of the user, limiting the access of the target device to the service by preventing copying, sharing or a combination thereof of content provided to the target device via the service.

2. The non-transitory computer-readable storage medium of claim 1, wherein the authenticating of the single identification reference comprising analyzing the single identification reference in comparison to a group of identification references associated with the user, wherein any of the group of identification references enables the first determination that the single identification reference is valid.

3. The non-transitory computer-readable storage medium of claim 1, wherein the operations further comprise adapting the content according to capabilities of the target device.

4. The non-transitory computer-readable storage medium of claim 1, wherein the limiting of the access of the target device to the service comprises limiting the access to a time period.

5. The non-transitory computer-readable storage medium of claim 1, wherein the target device is a merchant device, and wherein the service is a sale to the user.

6. The non-transitory computer-readable storage medium of claim 1, wherein the single identification reference comprises facial scanning performed by the target device.

7. The non-transitory computer-readable storage medium of claim 6, wherein the single identification reference comprises voice scanning performed by the target device.

8. A service management system, comprising:

a memory that stores executable instructions; and a controller coupled with the memory, wherein the controller, responsive to executing the instructions, performs operations comprising:

receiving, from a target device, an identification reference in association with a request for service by a user, wherein the identification reference is provided to the target device when the request for service is generated by the target device;

authenticating the identification reference;

determining if the service is enabled for the user on a second device;

responsive to a first determination that the identification reference is valid according to the authenticating and responsive to a second determination that the service is not enabled for the user on the second device, providing the target device with access to the service;

determining whether the target device is associated with the user; and responsive to a determination that the target device is not associated with the user, limiting the access of the target device to the service according to a security policy.

9. The service management system of claim 8, wherein the operations further comprise adapting content provided via the service according to capabilities of the target device.

10. The service management system of claim 8, wherein the security policy prevents copying, sharing or a combination thereof of content provided to the target device via the service.

11. The service management system of claim 8, wherein the identification reference is not associated with the target device, and wherein the identification reference is inputted into the target device via a user interface without utilizing an identity module of the target device.

12. The service management system of claim 8, wherein the identification reference comprises a biometric signature, a smart card signature, a magnetic signature, a barcode signature, an RFID signature, or any combination thereof.

13. The service management system of claim 12, wherein the biometric signature comprises an audible recognition, an image recognition, or any combination thereof.

14. The service management system of claim 8, wherein the target device is a merchant device, and wherein the service is a sale to the user.

15. The service management system of claim 8, wherein the identification reference is a single identification reference.

16. A service management system, comprising:

a memory that stores executable instructions; and a controller coupled with the memory, wherein the controller, responsive to executing the instructions, performs operations comprising:

enabling a selection of a service from among a group of services provided by service centers on a target device by a user;

receiving, from the target device, an identification reference associated with the selection of the service, wherein the identification reference is provided to the target device when a request for service is generated by the target device;

authenticating the identification reference;

determining if the service is enabled for the user on a second device;

responsive to a first determination that the identification reference is valid according to the authenticating and responsive to a second determination that the service is not enabled for the user on the second device, providing the target device with access to the service;

determining whether the target device is associated with the user; and responsive to a determination that the target device is not associated with the user, limiting the access of the target device to the service by preventing copying, sharing or a combination thereof of content provided to the target device via the service.

17. The service management system of claim 16, wherein the identification reference is not associated with the target device, wherein the identification reference is inputted into the target device by a user via a user interface of the target device, and wherein the identification reference is inputted into the target device via the user interface without utilizing an identity module of the target device.

18. The service management system of claim 16, wherein the identification reference is a single identification reference.

19. The service management system of claim 16, wherein the target device is a merchant device, and wherein the service is a sale to the user.

20. The service management system of claim 16, wherein the authenticating of the identification reference comprising analyzing the identification reference in comparison to a group of identification references associated with the user, wherein any of the group of identification references enables the first determination that the identification reference is valid.

* * * * *